Aug. 26, 1958     E. W. JOHNSON     2,849,658
CONTROL APPARATUS

Filed Dec. 24, 1953     4 Sheets-Sheet 1

WITNESSES:
E. A. McCloskey
K. W. Thomas

INVENTOR
Edwin W. Johnson.
BY
ATTORNEY

Aug. 26, 1958  E. W. JOHNSON  2,849,658
CONTROL APPARATUS

Filed Dec. 24, 1953  4 Sheets-Sheet 2

Aug. 26, 1958   E. W. JOHNSON   2,849,658
CONTROL APPARATUS

Filed Dec. 24, 1953   4 Sheets-Sheet 4

United States Patent Office 2,849,658
Patented Aug. 26, 1958

2,849,658

CONTROL APPARATUS

Edwin W. Johnson, Pittsburgh, Pa., assignor to Westinghouse Electric Corporation, East Pittsburgh, Pa., a corporation of Pennsylvania Application December 24, 1953, Serial No. 400,219

9 Claims. (Cl. 315—344)

This invention relates to control means for positioning an electrical arc, and, more particularly, to arc positioning control means used in conjunction with an electric arc furnace.

In the direct-current arc furnaces now extensively employed for the arc melting of the so-called "refractory active" metals such as titanium, zirconium, hafnium, vanadium and molybdenum, the melting is accomplished by means of a direct-current arc propagated between the metal being melted, or ingot, which forms the anode of the arc, and an electrode, the cathode, which is an electrical conductor of generally a considerably smaller diameter than the anode, the electrode being suspended just above the surface being melted. The ingot is usually built up from successive additions of feed material introduced from above the molten pool, and is progressively cast in a water-cooled copper mold that surrounds the arc as well as the ingot. The electrode is usually tipped with a refractory conductor such as tungsten or graphite that is not itself consumed during the process, a nonconsumable electrode, or the electrode may be of the composition being melted and may then itself be melted or consumed, a consumable electrode, to form either the primary or a secondary source of feed material for the ingot being cast.

In the normal operation of such a prior art furnace, the arc is propagated directly downward from the electrode to yield an intense local heating of the anode at the base of the arc column. Although the metal in the immediate vicinity of this "anode spot" is melted readily by arcs of moderate power consumption, the molten zone often does not extend over the entire anode surface because of the strong peripheral cooling by the chilled copper mold. Good arc melting practice requires that the entire anode surface be completely fused at each stage of the melting and casting process. With stationary electrodes this condition is now achieved only by the use of considerably higher arc power inputs than those required to melt only a small portion of the anode surface. It is more economical of power and also more satisfactory in general to use an arc of moderate power and to move this arc about over the anode surface to obtain complete fusion. Such arc motion, or arc position control, is now usually achieved by the use of electrodes fitted for lateral mobility of their tips over the ingot surface. Such electrodes are of two main types. First, a straight electrode fitted for a pivoted motion about any desired axis in a horizontal plane in the vicinity of the furnace cover, such motion being provided by a ball and socket type joint or a Sylphon type bellows connecting the electrode with the furnace head. Or, second, a rotating electrode fitted with an eccentric, or offset, tip that describes a fixed circular path over the anode surface.

A major difficulty in the actual operation of arc furnaces employing non-consumable electrodes is the anchoring of the upper extremity of the arc column, or "cathode spot," to a point considerably removed from its normal position at the very bottom of the electrode tip. This behavior is probably due to a non-uniform surface alloying of the electrode tip with bits of the metal being melted, the latter having been thrown onto the tip as a result of either an improper feeding technique or a spatter of the molten bath. "Arc cathode anchoring" in its severest form is manifested in the propagation of the arc from the electrode at a wide angle from the vertical, such that the anode spot is significantly displaced from its normal position directly beneath the end of the electrode. Since rapid melting occurs in the immediate vicinity of the anode spot, the need for a positive control over the position of this spot under conditions of arc cathode anchoring is obvious.

The same contamination of the electrode tip that leads to arc cathode anchoring is also responsible for an unfavorable shift in the distribution of the arc power. When the electrode tip is free of impurities, most of the arc heat is dissipated at the anode where it is efficiently utilized in melting. The presence on the cathode of lower-melting alloys results, however, in the useless dissipation of a significantly greater proportion of the total arc power at the cathode, with correspondingly less power being available for melting at the anode. The area of the molten zone therefore decreases substantially as the tip becomes contaminated, indicating an even greater need for positive control of the arc anode spot position.

The contamination of the electrode surface that leads to unfavorable arc action may result from either the spatter of molten metal upward from the bath or the impingement on the electrode tip of feed material dropped from above. The spatter is presumed to result from the rapid volatilization of low boiling impurities in the melting stock added to the molten bath, and the electrode contamination resulting from this spatter can therefore presumably be avoided by the use of melting stocks containing no low-boiling impurities.

The impingement of falling feed on the electrode can be avoided either through suitable furnace design or by appropriate operating procedure. A deflector shield attached to a movable electrode just above the heated portion of the tip would be adequate for the purpose, but it would also prevent observation of the arc and in addition would severely limit the lateral travel of the tip. Deflector shields are practical, however, with stationary electrodes. With unshielded mobile electrodes the impingement of falling feed is usually avoided by moving the electrode tip as far away as possible from the feed port while feeding is actually in progress. During periods of "arc anchoring," however, the position of the cathode spot may be such that the electrode tip cannot be brought as close to the mold wall as desired because of the danger of the arc striking the wall and severely damaging it. The electrode must then remain nearer the center of the furnace, where it is again subject to the impingement of falling feed.

The disadvantages of the mobile electrode as the sole means of controlling the arc anode spot position are apparent from the foregoing discussion. Any electrode must be so designed and constructed as to carry heavy electric currents and large flows of water both into and away from the electrode tip cooling jacket. Providing for these high flows is considerably more difficult when the electrode is mobile than when it is stationary. Compared with stationary electrodes, therefore, the mobile electrode is considerably the more complex in design and hence the more expensive to construct.

Although the mobile electrode appears satisfactory for periods of normal arc behavior, that is, when the arc propagates from the very bottom of the electrode tip, it is not as effective when the arc anchors to another point on the cathode. The rotating eccentric tip design of electrode is particularly unsuitable in this situation because the arc may anchor to a spot that continually faces the wall of the ingot mold, with the consequence that the arc follows and heats only the periphery of the anode and not the center, or it may strike the mold wall and severely damage it. For complete mechanical control of the position of the anode spot during cathode anchoring, a mobile electrode incorporating provisions for both pivoting about a horizontal axis and rotation about a vertical axis would be required. Such a design, however, is extremely complex.

An additional disadvantage of the mobile electrode is its inefficient utilizaton of arc power during periods of feeding, when the electrode must be brought very near the mold wall to avoid the impingement of falling feed on the tip. At such times the arc column is also very near the mold wall, with the consequence that the available power is largely lost directly to the mold rather than utilized for melting as it would be if the anode spot were nearer the center of the ingot surface. In view of these disadvantages it is clear that the mobile electrode is far from satisfactory as the sole means of controlling the position of the arc anode spot during arc melting and casting.

Magnetic fields have also been used heretofore for deflecting a direct-current arc. In these prior art devices, small permanent magnets are manipulated manually which produces a haphazard control of the positioning of the arc and requires considerable skill on the part of the operator.

An object of this invention is to provide for conveniently applying and controlling a magnetic field, variable as to both strength and direction, for the purpose of continuously controlling, by magnetic deflection, the position of an electric arc.

Another object of this invention is to provide for magnetically deflecting an electric arc by means of a manually controllable single hand lever, to thereby control the movement of one end of the electric arc with respect to a bath of molten metal.

A further object of this invention is to provide for magnetically deflecting an electric arc in a direction corresponding to the direction of movement of a single hand lever which is connected to control the positioning of the arc.

Other objects of this invention will become apparent from the following description when taken in conjunction with the accompanying drawings, in which.

Figure 1:
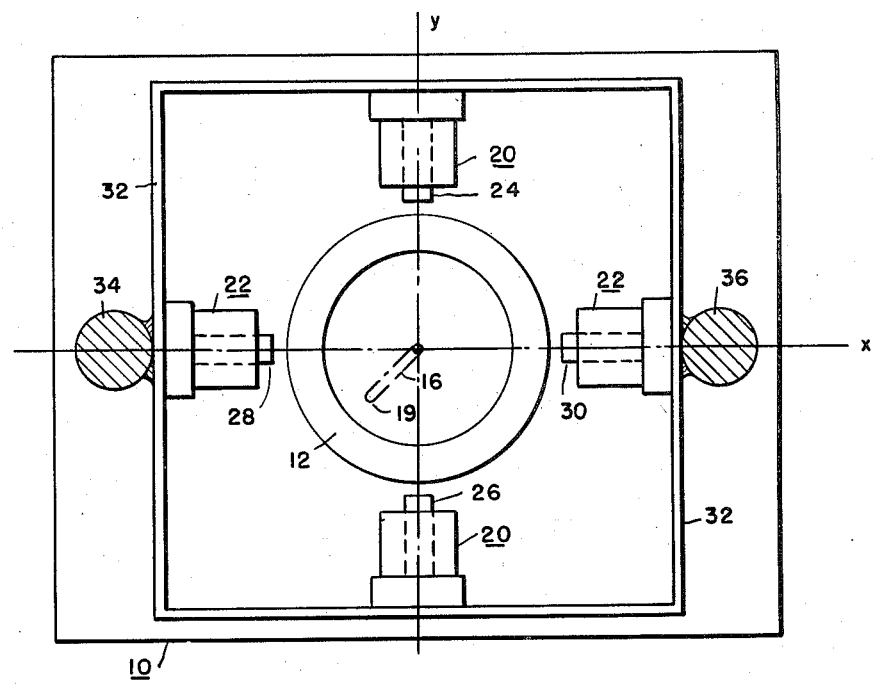
Figure 1 is a plan view illustrating the structural features of an electric arc furnace embodying a teaching of this invention.
Figure 2:
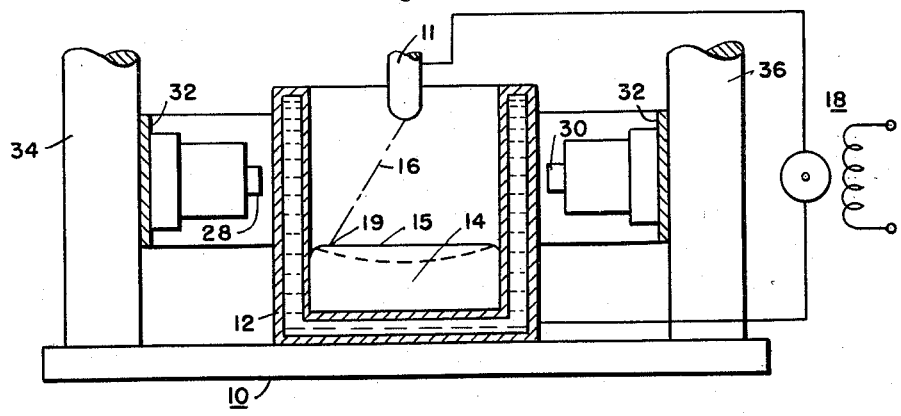
Fig. 2 is a view in side elevation, partly in section, of the electric arc furnace illustrated in Fig. 1.

Referring to Figs. 1 and 2, there is illustrated an electric arc furnace 10 embodying a teaching of this invention. As is customary, the arc furnace 10 comprises an electrode 11 and a suitable water-cooled copper mold or crucible 12 for containing an ingot 14 and into which feed material (not shown) is introduced from above the molten ingot surface 15. In order to produce an electric arc 16 which is propagated between the electrode 11 and the molten ingot surface 15, a suitable source of direct-current power 18 is electrically connected to the crucible 12 and the electrode 11. In this instance, the source 18 is so interconnected with the crucible 12 and with the electrode 11 that the molten ingot surface 15 forms the anode for the electric arc 16 and the electrode 11 forms the cathode for the arc.

In order to control the positioning of the anode spot 19 of the arc 16 with respect to the molten ingot surface 15, two electromagnets 20 and 22 are provided. As illustrated, the electromagnet 20 includes two magnetic pole pieces 24 and 26 which are constructed of a soft ferromagnetic material such as iron or low carbon steel. In like manner, the electromagnet 22 comprises two magnetic pole pieces 28 and 30 which correspond to the pole pieces 24 and 26 of the electromagnet 20. As can be seen from Figs. 1 and 2, the pole pieces 24, 26, 28 and 30 are arranged radially at 90 degree intervals about the crucible 12, and are disposed in a common plane which is normal to the axis of the electric arc 16 when the arc is in its normal or undeflected position.

For the purpose of improving the magnetic efficiency of the electromagnets 20 and 22, the four pole pieces 24, 26, 28 and 30 are preferably attached to a common external yoke 32, also constructed of a soft magnetic material, of which the cross-sectional area is roughly equal to that of each pole piece. In this instance, the yoke 32 also functions as a convenient supporting structure for the pole pieces 24, 26, 28 and 30, the yoke 32 being suitably secured to the support members 34 and 36 so that the pole pieces 24, 26, 28 and 30 are properly maintained in position with respect to the crucible 12 and the electric arc 16. Thus, the pole pieces 24 and 26 comprise the core member for the electromagnet 20 and the pole piece 28 and 30 comprise the core member for the electromagnet 22.

Figure 3:
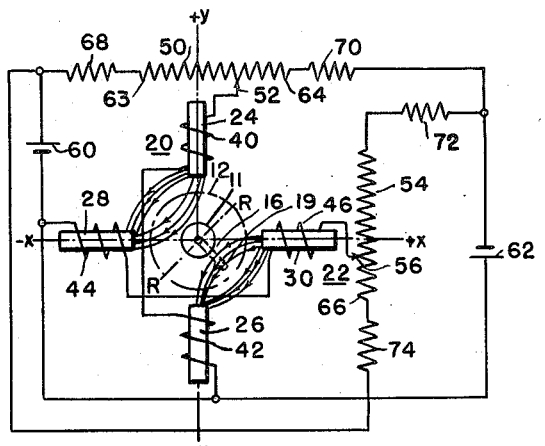
Fig. 3 is a schematic diagram of one type of balancing circuit that can be utilized in carrying out this invention.

Referring to Fig. 3, there is illustrated a balancing circuit which can be utilized in conjunction with the apparatus illustrated in Figs. 1 and 2, and in which like components of Figs. 1, 2 and 3 have been given the same reference characters. The balancing circuit illustrated in Fig. 3 is provided in order to control the polarization of the pole pieces 24, 26, 28 and 30, and thus the positioning of the anode spot 19 of the electric arc 16. This is accomplished by controlling the magnitude and the direction of the current flow through a plurality of coils 40, 42, 44 and 46, which are disposed in inductive relationship with the pole pieces 24, 26, 28 and 30, respectively. In particular, the coils 40 and 42 are so disposed on the pole pieces 24 and 26, respectively, of the electromagnet 20 as to produce oppositely polarized pole pieces 24 and 26, the oppositely polarized pole pieces 24 and 26 being so positioned with respect to the electric arc 16 that when current flows in either direction through the coils 40 and 42, the arc 16 is deflected in the $x$-direction, to the left if the current flow through the coils 40 and 42 is in a given direction, and to the right if the current flow through the coils 40 and 42 is in the opposite direction. This deflection of the arc 16 is due to the interaction between the magnetic flux established by the pole pieces 24 and 26 and the magnetic flux established by the arc 16. In like manner, the coils 44 and 46 are so disposed on the pole pieces 28 and 30 of the electromagnet 22 as to produce oppositely polarized pole pieces 28 and 30, the oppositely polarized pole pieces 28 and 30 being so positioned with respect to the arc 16 that when current flows in either direction through the coils 44 and 46, the arc 16 is deflected in the $+y$-direction, as illustrated in Fig. 3, when the current flow through the coils 44 and 46 is in one direction and is deflected in the $-y$-direction, as illustrated in Fig. 3, when the current flow through the coils 44 and 46 is in the opposite direction. This deflection of the arc 16 is due to the interaction between the magnetic flux established by the pole pieces 28 and 30 and the magnetic flux established by the arc 16.

In order to control the magnitude and the direction of the current flow through the coils 40 and 42 of the electromagnet 20, and through the coils 44 and 46 of the electromagnet 22, and thus the positioning of the anode spot 19 of the electric arc 16 with respect to the molten ingot surface 15, the balancing circuit illustrated in Fig. 3 is provided. In general, the balancing circuit comprises a variable impedance member, specifically a variable resistor 50, having a movable contact member 52 for controlling the direction and magnitude of the current flow through the coils 40 and 42 of the electromagnet 20, and a variable impedance member, specifically a variable resistor 54, having a movable contact member 56 for controlling the magnitude and direction of the current flow through the coils 44 and 46 of the electromagnet 22.

As illustrated, suitable sources of direct-current 60 and 62 of equal potential are so interconnected with the coils 40 and 42 of the electromagnet 20 and with the coils 44 and 46 of the electromagnet 22 that when the movable contact member 52 is positioned midway between the ends 63 and 64 of the variable resistor 50, and when the movable contact member 56 is positioned midway between the ends 65 and 66 of the variable resistor 54, 44 or 46. Thus, with the movable contact members 52 and 56 so positioned, the balancing circuit illustrated in Fig. 3 is in the balanced position.

The relationship between the magnitude of the current flow through the coils 40 and 42 of the electromagnet 20 and the displacement of the movable contact member 52 from center is proportional or "linear" for small displacements of the movable contact member 52, and becomes progressively less so as the displacement of the contact member 52 and hence the magnitude of the current flow through the coils 40 and 42 increases. In like manner, the relationship between the magnitude of the current flow through the coils 44 and 46 of the electromagnet 22 and the displacement of the movable contact member 56 from its midpoint position as illustrated, is proportional or "linear" for small displacements and becomes progressively less so as the displacement of the contact member 56 and hence the magnitude of the current flow through the coils 44 and 46 increases. The departure from linearity may be minimized by having sufficient potential available at the sources of direct current 60 and 62 to deliver adequate current to the coils 40, 42, 44 or 46, when the movable contact members 52 and 56 are restricted to only the middle portion of the variable resistors 50 and 54, respectively. However, an equivalent and preferable condition is obtained by connecting matched resistors 68 and 70 in series circuit relationship with the variable resistor 50 and by connecting matched resistors 72 and 74 in series circuit relationship with the variable resistor 54. By providing these matched resistors 68, 70, 72 and 74, the full range of the variable resistors 50 and 54 may be employed for control purposes without undue distortion in current response at the extreme settings of the variable resistors 50 and 54.

In practice, the coils 40 and 42 of the electromagnet 20 can either be connected in series circuit relationship with one another as illustrated or in parallel circuit relationship with one another. In like manner, the coils 44 and 46 of the electromagnet 22 can either be connected in series circuit relationship with each other as illustrated, or in parallel circuit relationship with one another. As illustrated, circuit means is provided for connecting the movable contact member 52 of the variable resistor 50 to one end of the series connected coils 40 and 42 of the electromagnet 20 and for connecting the movable contact member 56 of the variable resistor 54 to one end of the series connected coils 44 and 46 of the electromagnet 22, so that the magnitude and direction of the current flow through the coils 40 and 42 is determined by the setting of the movable contact member 52 of the variable resistor 50 and so that the magnitude and direction of the current flow through the coils 44 and 46 is determined by the setting of the movable contact member 56 of the variable resistor 54. This circuit means includes the series connected sources of direct current 60 and 62. In this instance the negative side of the source of direct current 62 is connected to the junction point of the resistors 70 and 72, and the positive side of the source of direct current 60 is connected to the junction point of the resistors 68 and 74, while the junction point of the sources of direct current 60 and 62 are connected to the coils 42 and 44 of the electromagnets 20 and 22, respectively.

In operation, as hereinbefore mentioned, with the movable contact member 52 positioned midway between the ends 63 and 64 of the variable resistor 50, and with the movable contact member 56 positioned midway between the ends 65 and 66 of the variable resistor 54, substantially no current flows through the coils 40, 42, 44 and 46 of the electromagnets 20 and 22. However, if the movable contact member 52 of the variable resistor 50 is actuated from its mid-position towards the end 64, the balancing circuit is unbalanced in such a direction that a resultant current flows from the junction point of the direct-current sources 60 and 62 through the coils 42 and 44 to the movable contact member 52 to thereby polarize the pole pieces 26 and 24 as illustrated in Fig. 3. As the pole pieces 26 and 24 are being polarized as illustrated, the arc 16 is deflected to the right along or generally parallel with the x-axis.

On the other hand, if the movable contact member 56 of the variable resistor 54 is actuated from its mid-position towards the end 66, with the movable contact member 52 positioned midway between the ends 63 and 64 of the variable resistor 50, a resultant current flows from the movable contact member 56 through the coils 46 and 44 of the electromagnet 22 to the junction point of the direct-current sources 60 and 62, to thereby polarize the pole pieces 30 and 28, as illustrated in Fig. 3. As the pole pieces 28 and 30 are being polarized, the arc 16 is deflected in the −y-direction, as illustrated in Fig. 3, along or generally parallel with the y-axis. However, if the movable contact member 52 is simultaneously actuated from its mid-position towards the end 64 of the variable resistor 50 when the movable contact member 56 is being actuated from its mid-position towards the end 66 of the variable resistor 54, the arc 16 will be deflected downward and to the right in the horizontal plane depicted in Fig. 3. Thus, by simultaneously actuating the movable contact members 52 and 56 of the variable resistors 50 and 54, respectively, as will be explained more fully hereinafter, the anode spot 19 of the arc 16 can be moved to any position with respect to the molten surface 15 of the ingot 14. In order to more clearly understand the operation of the apparatus illustrated in Fig. 3, the direction of the resultant magnetic field established by the electromagnets 20 and 22 is illustrated as being along the line R—R when the movable contact members 52 and 56 of the variable resistors 50 and 54, respectively, are positioned as shown in Fig. 3. This resultant magnetic field established by the electromagnets 20 and 22 reacts with the magnetic flux established by the arc 16 to thereby effect a deflection of the arc 16 simultaneously in the +x and −y directions, as illustrated in Fig. 3.

Figure 4:
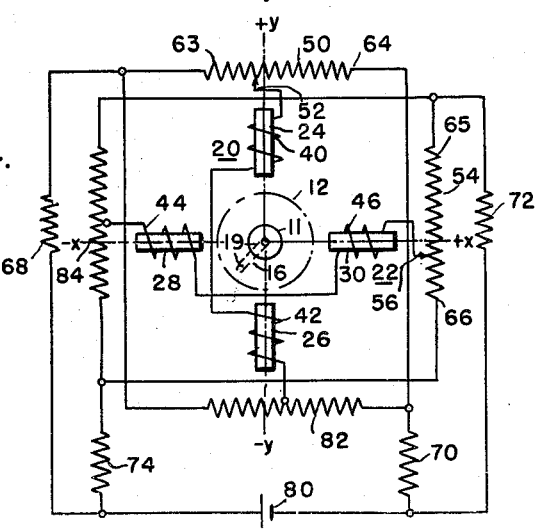
Fig. 4 is a schematic diagram of another type of balancing circuit that can be utilized in carrying out this invention.

Referring to Fig. 4, there is illustrated another type of balancing circuit which can be used in conjunction with the apparatus illustrated in Figs. 1 and 2 to control the magnitude and the direction of the current flow through the coils 40 and 42 of the electromagnet 20 and the direction and magnitude of the current flow through the coils 44 and 46 of the electromagnet 22, to thus control the position of the anode spot 19 of the arc 16 with respect to the molten surface 15 of the ingot 14. The balancing circuit illustrated in Fig. 4 is of the Wheatstone bridge type and differs from the balancing circuit illustrated in Fig. 3 inasmuch as only a single source of direct current 80 need be provided. In order to simplify the description, like components of Figs. 3 and 4 have been given the same reference characters.

As illustrated in Fig. 4, the variable resistor 50 comprises two legs of a Wheatstone bridge and a resistor 82 comprises the other two legs of the Wheatstone bridge. The series connected coils 40 and 42 of the electromagnet 20 are connected across one diagonal of the Wheatstone bridge and the source of direct current 80 is connected to the other diagonal of the Wheatstone bridge through the matching resistors 68 and 70. On the other hand, the variable resistor 54 comprises two legs of another Wheatstone bridge and a resistor 84 comprises the other two legs of this latter Wheatstone bridge. The series connected coils 44 and 46 of the electromagnet 22 are connected across one diagonal of this latter Wheatstone bridge and the source of direct current 80 is connected to the other diagonal of the Wheatstone bridge through the matching resistors 72 and 74. In the apparatus of Fig. 4, the matching resistors 68 and 70 and the matching resistors 72 and 74 perform the same function as was performed in the apparatus of Fig. 3.

In operation, with the movable contact member 52 positioned midway between the ends 63 and 64 of the variable resistor 50, and with the movable contact member 56 positioned midway between the ends 65 and 66 of the variable resistor 54, substantially no current flows through the coils 40, 42, 44 and 46 of the electromagnets 20 and 22. However, when only the movable contact member 52 of the variable resistor 50 is actuated from its midposition towards the end 63, current flows from the movable contact member 52 through the coils 40 and 42 of the electromagnet 20 to thereby polarize the pole pieces 24 and 26 as illustrated in Fig. 4. As the pole pieces 24 and 26 are being polarized as illustrated in Fig. 4, the arc 16 is deflected to the left along or generally parallel with the $x$-axis. On the other hand, if only the movable contact member 56 of the variable resistor 54 is actuated from its mid-position towards the end 66, current flows from the movable contact member 56 through the coils 46 and 44 to thereby polarize the pole pieces 28 and 30, as illustrated in Fig. 4. As the pole pieces 28 and 30 are thus being polarized, the arc 16 is deflected in the $-y$-direction, as illustrated in Fig. 4, along or generally parallel with the $y$-axis. Therefore, as the movable contact member 52 of the variable resistor 50 is actuated towards its associated end 63 and as the movable contact 56 is simultaneously actuated towards its associated end 66, the arc 16 is deflected downward and to the left in the horizontal plane depicted in Fig. 4. Also, as the movable contact members 52 and 56 are simultaneously actuated to various settings, the anode spot 19 of the arc 16 is moved so as to assume any position with respect to the molten surface 15 of the ingot 14.

An increased efficiency of utilizing the available current source is obtainable when the movable contact member 52 of the variable resistor 50 is moved in synchronism, as by mechanical ganging, with a corresponding movable contact member (not shown) of the resistor 82. Of course, the movable contact member 52 would move in the opposite direction to the movable contact member (not shown) of the resistor 82. The efficiency is also increased when the movable contact member 56 of the variable resistor 54 is moved in synchronism, but in the opposite direction to, a corresponding movable contact member (not shown) of the resistor 84.

Figure 5:
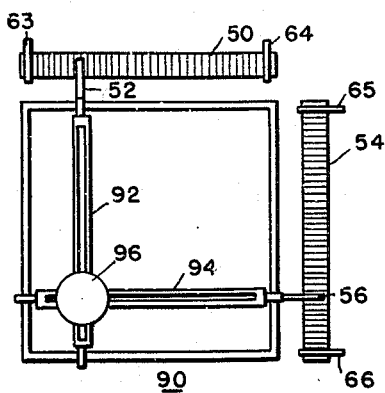
Fig. 5 illustrates one type of mechanical means that can be utilized for unbalancing the circuits illustrated in Figs. 3 and 4.

Referring to Fig. 5, there is illustrated mechanical means 90 suitable for operation with either the balancing circuit illustrated in Fig. 3 or the balancing circuit illustrated in Fig. 4, it merely being necessary to connect the remainder of the apparatus illustrated in either Fig. 3 or 4 to the proper points on the variable resistors 50 and 54, which in Fig. 5 are linear variable resistors. In order to simplify the description, like components of Figs. 3, 4 and 5 have been given the same reference characters.

In general, the mechanical means 90 comprises two slotted control arms 92 and 94, the control arm 92 being mechanically connected to the movable contact member 52 of the variable resistor 50, and the control arm 94 being mechanically connected to the movable contact member 56 of the variable resistor 54. A hand lever 96 passes through the slots in the two slotted control arms 92 and 94 so that the movable contact members 52 and 56 can be simultaneously actuated by means of the hand lever 96, to thus simultaneously vary the settings of the variable resistors 50 and 54, respectively.

It is to be noted that the control means 90 can be so interconnected with either the apparatus illustrated in Fig. 3 or with the apparatus illustrated in Fig. 4 that the anode spot of the arc 16 is actuated in the same direction as the hand lever 96. Thus, as the hand lever 96 is being actuated to the position illustrated in Fig. 5, the anode spot 19 of the arc 16 is deflected simultaneously in the $-x$ and $-y$-direction, as illustrated in Fig. 4. However, if the hand lever 96 is actuated to the far right, from its position as illustrated in Fig. 5, so as to only actuate the movable contact member 52 towards its associated end 64, then the anode spot 19 of the arc 16 is deflected in the $+x$-direction, as illustrated in Fig. 3.

Figure 6:
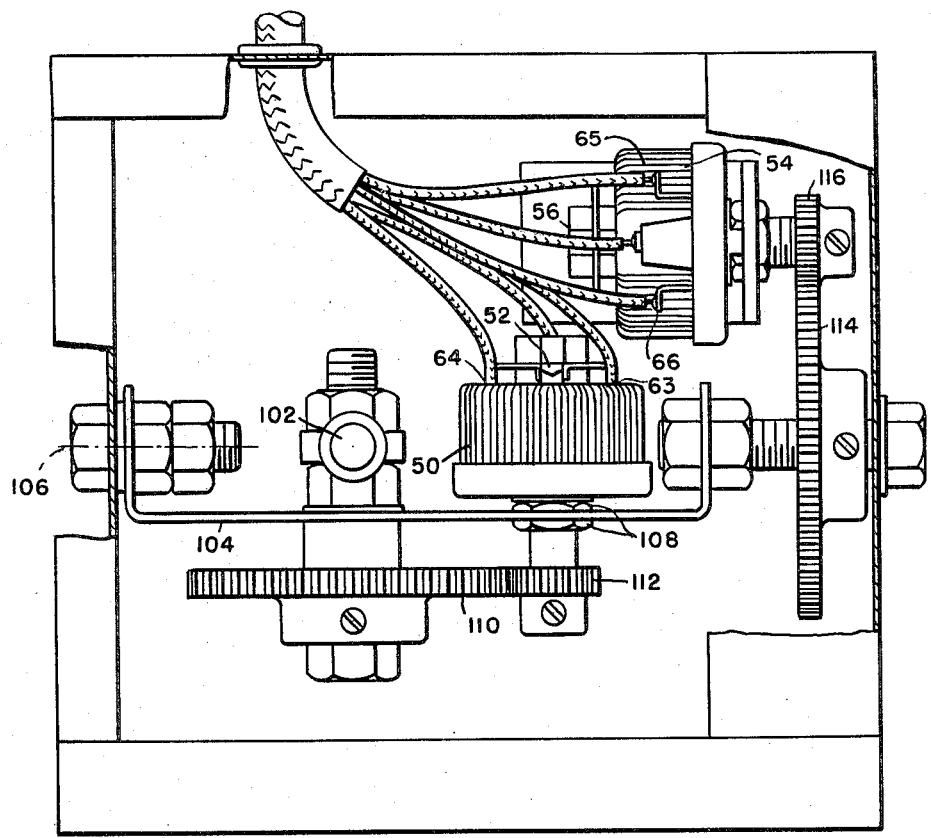
Fig. 6 is a plan view, partly in section, of another type of mechanical means that can be utilized for unbalancing the circuits illustrated in Figs. 3 and 4.
Figure 7:
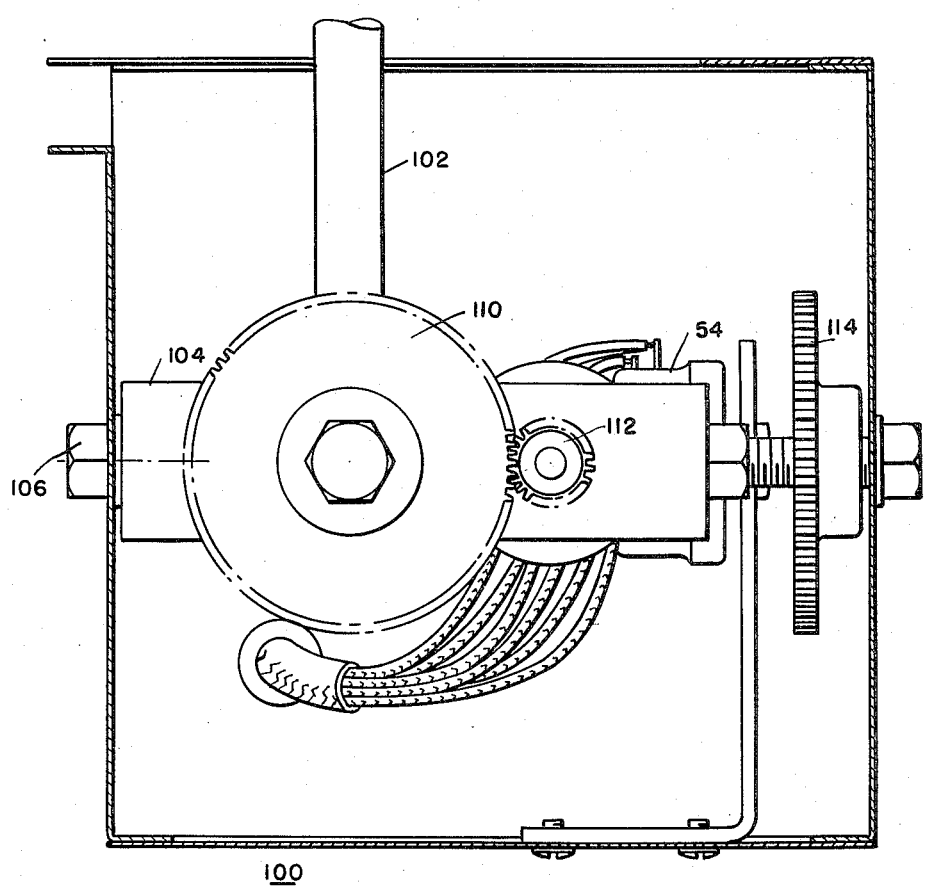
Fig. 7 is a view in side elevation, partly in section, of the mechanical means illustrated in Fig. 6.

Referring to Figs. 6 and 7, there is illustrated a preferred mechanical means 100 for use with either the apparatus illustrated in Fig. 3 or with the apparatus illustrated in Fig. 4. In the mechanical means 100, the variable resistors 50 and 54 are circular rheostats. In operation, the settings of the rheostats 50 and 54 are controlled by a single hand lever 102 which is illustrated in the neutral position in which the movable contact members 52 and 56 are in their mid-positions.

As illustrated, the mechanical means 100 includes a pivotable bracket member 104 which is pivoted about an imaginary line 106. The rheostat 50 is suitably mounted on the pivotable bracket member 104 by means of nuts 108. Also mounted on the pivotable bracket member 104 is the hand lever 102 which is mechanically connected to the rheostats 50, by a gear train including the gears 110 and 112, so that the setting of the rheostat 50 can be varied by means of the hand lever 102.

In order to vary the setting of the rheostat 54 in accordance with the degree of pivoting of the pivotable bracket member 104, as effected by the hand lever 102, the pivotable bracket member 104 is connected to the rheostat 54 by means of a gear train including the gears 114 and 116.

It is to be noted that in operation, the anode spot 19 of the arc 16 is actuated in the same direction as the movement of the hand lever 102. That is, if it is desired to actuate the anode spot 19 of the arc 16 to the position as illustrated in Fig. 3, the hand lever 102, with reference to Fig. 6, is actuated downwardly and to the right. Such a movement of the hand lever 102 actuates the movable contact member 52 of the rheostat 50 from its mid-position towards its associated end 64 of the rheostat 50 and actuates the movable contact member 56 of the rheostat 54 from its mid-position towards its associated end 66 of the rheostat 54.

On the other hand if it is desired to actuate the anode spot 19 of the arc 16 simultaneously in the $-x$ and $-y$-directions, as illustrated in Fig. 4, then the hand lever 102, with reference to Fig. 6, is actuated downwardly and to the left. Such a movement of the hand lever 102 actuates the movable contact member 52 of the rheostat 50 from its mid-position towards its associated end 63 and actuates the movable contact member 56 of the rheostat 54 from its mid-position towards its associated end 66.

The apparatus embodying the teachings of this invention has several advantages. For instance, the positioning of the anode spot 19 of the arc 16 can be controlled by a single hand lever. In addition, the movement of the anode spot 19 of the arc 16 corresponds to the direction of movement of either the hand lever 102 of the mechanical means 100 or of the hand lever 96 of the mechanical means 90. Further, since the anode spot 19 of the arc 16 can be positioned without moving the electrode 11, a simple stationary type of electrode can be provided.

The use of the electromagnetic arc deflection eliminates the loss of melting efficiency accompanying the positioning of the prior art mobile electrode near the mold wall during feed additions, since in the apparatus embodying the teachings of this invention the anode spot 19 of the arc 16 may still be magnetically positioned wherever it is needed most. A high efficiency of arc power utilization is thus maintained. Also, by utilizing the apparatus embodying the teachings of this invention, a proper melting operation can be obtained with a minimum of arc power. Further, the deleterious effects of arc cathode anchoring are overcome when utilizing the apparatus illustrated in the drawings, since it is not necessary to move the electrode 11 close to the walls of the crucible 12. Finally, the apparatus embodying the teachings of this invention has none of the disadvantages of the prior art mobile electrodes as hereinbefore described.

Since certain changes may be made in the above apparatus and circuits and different embodiments of the invention could be made without departing from the scope thereof, it is intended that all matter contained in the above description or shown in the accompanying drawings shall be interpreted as illustrative and not in a limiting sense.

I claim as my invention:

1. In an arc positioning control device, the combination comprising, means for producing an electric arc, two electromagnets, each electromagnet including at least two coils, the coils of the two electromagnets being so positioned around said arc that when current flows through the coils of one of the two electromagnets said arc is deflected in one direction and when current flows through the coils of the other of the two electromagnets said arc is deflected in another direction, a balancing circuit so connected to the coils of the two electromagnets that when the balancing circuit is at a predetermined setting the current flow through the coils of the two electromagnets is substantially zero, and means connected to the balancing circuit for unbalancing the balancing circuit, to thereby change the relative magnitudes of the current flow through the coils of the two electromagnets and thus deflect said arc in a given direction.

2. In an arc positioning control device, the combination comprising, means for producing an electric arc, two electromagnets, each electromagnet including at least two core members and a coil disposed thereon in inductive relationship, the core members of the two electromagnets being so positioned around said arc that when current flows through the coils of one of the two electromagnets said arc is deflected in one direction and when current flows through the coils of the other of the two electromagnets said arc is deflected in another direction, a balancing circuit so connected to the coils of the two electromagnets that when the balancing circuit is at a predetermined setting the current flow through the coils of the two electromagnets is substantially zero, and means connected to the balancing circuit for unbalancing the balancing circuit, to thereby change relative magnitudes of the current flow through the coils of the two electromagnets and thus deflect said arc in a given direction.

3. In an arc positioning control device, the combination comprising, means for producing an electric arc, two electromagnets, each electromagnet including a pair of pole pieces and a coil so disposed on each pole piece as to produce oppositely polarized pole pieces when current flows through the coils of said each electromagnet, the pole pieces of the two electromagnets being so positioned around said arc that when current flows through the coils of one of the two electromagnets said arc is deflected in one direction and when current flows through the coils of the other of the two electromagnets said arc is deflected in another direction, a balancing circuit so connected to the coils of the two electromagnets that when the balancing circuit is at a predetermined setting the current flow through the coils of the two electromagnets is substantially zero, and means connected to the balancing circuit for unbalancing the balancing circuit to thereby effect a current flow through at least the coils of one of the two electromagnets to thus deflect said arc in a given direction.

4. In an arc positioning control device, the combination comprising, means for producing an electric arc, two electromagnets, each electromagnet including a pair of pole pieces and a coil so disposed on each pole piece as to produce oppositely polarized pole pieces when current flows through the coils of said each electromagnet, the pole pieces of the two electromagnets being so positioned around said arc that when current flows through the coils of one of the two electromagnets said arc is deflected in one direction and when current flows through the coils of the other of the two electromagnets said arc is deflected in another direction, a balancing circuit so connected to the coils of the two electromagnets that when the balancing circuit is at a predetermined setting the current flow through the coils of the two electromagnets is substantially zero, and means including a single hand lever, connected to the balancing circuit for unbalancing the balancing circuit to thereby effect a current flow through at least the coils of one of the two electromagnets to thus deflect said arc in a given direction.

5. In an arc positioning control device, the combination comprising, means for producing an electric arc, two electromagnets, each electromagnet including a pair of pole pieces and a coil so disposed on each pole piece as to produce oppositely polarized pole pieces when current flows through the coils of said each electromagnet, the pole pieces of the two electromagnets being disposed in a common plane which is substantially normal to the axis of said arc when the current flow through the coils of the two electromagnets is substantially zero, the pole pieces of the two electromagnets being spaced radially from said arc at intervals of approximately ninety degrees so that when current flows through the coils of one of the two electromagnets said arc is deflected in one direction and when current flows through the coils of the other of the two electromagnets said arc is deflected in another direction, a balancing circuit so connected to the coils of the two electromagnets that when the balancing circuit is at a predetermined setting the current flow through the coils of the two electromagnets is substantially zero, and means connected to the balancing circuit for unbalancing the balancing circuit to thereby effect a current flow through at least the coils of one of the two electromagnets to thus deflect said arc in a given direction.

6. In an arc positioning control device, the combination comprising, means for producing an electric arc, two electromagnets, each electromagnet including a pair of pole pieces and a coil so disposed on each pole piece as to produce oppositely polarized pole pieces when current flows through the coils of said each electromagnet, the pole pieces of the two electromagnets being so positioned around said arc that when current flows through the coils of one of the two electromagnets said arc is deflected in one direction and when current flows through the coils of the other of the two electromagnets said arc is deflected in another direction, a balancing circuit including two variable impedance members and circuit means for connecting one of the two variable impedance members to the coils of said one of the two electromagnets and for connecting the other of the two variable impedance members to the coils of said other of the two electromagnets so that at a predetermined setting of the two variable impedance members the current flow through the coils of the two electromagnets is substantially zero, and mechanical means for controlling the settings of the two variable impedance members, said mechanical means including a pivotable bracket member, means for mounting said one of the two variable impedance members on the pivotable bracket member, a hand lever mounted on the pivotable bracket member and connected to the said one of the two variable impedance members so that the setting of the said one of the two variable impedance members can be varied by means of the hand lever, and means for connecting the pivotable bracket member to said other of the two variable impedance members so that the setting of the said other of the two variable impedance members can be varied in accordance with the degree of pivoting of the pivotable bracket member as effected by the hand lever.

7. In an arc positioning control device, the combination comprising, means for producing an electric arc, two electromagnets, each electromagnet including a pair of pole pieces and a coil so disposed on each pole piece as to produce oppositely polarized pole pieces when current flows through the coils of said each electromagnet, the pole pieces of the two electromagnets being disposed in a common plane which is substantially normal to the axis of said arc when substantially no current flows through the coils of the two electromagnets, the pole pieces of the two electromagnets being spaced radially from said arc at intervals of approximately ninety degrees so that when current flows through the coils of one of the two electromagnets said arc is deflected in one direction and when current flows through the coils of the other of the two electromagnets said arc is deflected in another direction, a balancing circuit including two variable impedance members, and circuit means for connecting one of the two variable impedance members to the coils of said one of the two electromagnets and for connecting the other of the two variable impedance members to the coils of said other of the two electromagnets so that at a predetermined setting of the two variable impedance members the current flow through the coils of the two electromagnets is substantially zero, and mechanical means for controlling the settings of the two variable impedance members, said mechanical means including a pivotable bracket member, means for mounting said one of the two variable impedance members on the pivotable bracket member, a hand lever mounted on the pivotable bracket member and connected to the said one of the two variable impedance members so that the setting of the said one of the two variable impedance members can be varied by means of the hand lever, and means for connecting the pivotable bracket member to said other of the two variable impedance members so that the setting of the said other of the two variable impedance members can be varied in accordance with the degree of pivoting of the pivotable bracket member as effected by the hand lever.

8. In an arc positioning control device, the combination comprising, means for producing an electric arc, two electromagnets, each electromagnet including a pair of pole pieces and a coil so disposed on each pole piece as to produce oppositely polarized pole pieces when current flows through the coils of said each electromagnet, the pole pieces of the two electromagnets being so positioned around said arc that when current flows through the coils of one of the two electromagnets said arc is deflected in one direction and when current flows through the coils of the other of the two electromagnets said arc is deflected in another direction, a balancing circuit including two variable impedance members, and circuit means for connecting one of the two variable impedance members to the coils of said one of the two electromagnets and for connecting the other of the two variable impedance members to the coils of said other of the two electromagnets so that at a predetermined setting of the two variable impedance members the current flow through the coils of the two electromagnets is substantially zero, and mechanical means for controlling the settings of the two variable impedance members, said mechanical means including a pivotable bracket member, means for mounting said one of the two variable impedance members on the pivotable bracket member, a hand lever mounted on the pivotable bracket member, gearing means for connecting the hand lever to the said one of the two variable impedance members so that the setting of the said one of the two variable impedance members can be varied by means of the hand lever, and other gearing means for connecting the pivotable bracket member to said other of the two variable impedance members so that the setting of the said other of the two variable impedance members can be varied in accordance with the degree of pivoting of the pivotable bracket member as effected by the hand lever.

9. In an arc positioning control device, the combination comprising, means for producing an electric arc, two electromagnets, each electromagnet including a pair of pole pieces and a coil so disposed on each pole piece as to produce oppositely polarized pole pieces when current flows through the coils of said each electromagnet, the pole pieces of the two electromagnets being so positioned around said arc that when current flows through the coils of one of the two electromagnets said arc is deflected in one direction and when current flows through the coils of the other of the two electromagnets said arc is deflected in another direction, a balancing circuit including two variable impedance members and circuit means for connecting one of the two variable impedance members to the coils of said one of the two electromagnets and for connecting the other of the two variable impedance members to the coils of said other of the two electromagnets so that at a predetermined setting of the two variable impedance members the current flow through the coils of the two electromagnets is substantially zero, and mechanical means for varying the settings of the two variable impedance members, said mechanical means including two slotted control arms, one of said control arms being connected to vary the setting of said one of the two variable impedance members and the other of said control arms being connected to vary the setting of said other of the two variable impedance members, and a hand lever that passes through the slots in the two slotted control arms so that the settings of the two variable impedance members can be simultaneously varied by actuating the hand lever.

References Cited in the file of this patent

UNITED STATES PATENTS

| | | |
|---|---|---|
| 743,237 | Bremer | Nov. 3, 1903 |
| 1,035,723 | Naville | Aug. 13, 1912 |
| 1,355,551 | Fortescue | Oct. 12, 1920 |
| 1,508,108 | Lombardi | Sept. 9, 1924 |